United States Patent [19]

Brown

[11] Patent Number: 4,675,351

[45] Date of Patent: Jun. 23, 1987

[54] LABELING ADHESIVES

[75] Inventor: Orville E. Brown, Elk Grove Village, Ill.

[73] Assignee: Borden, Inc., Columbus, Ohio

[21] Appl. No.: 819,479

[22] Filed: Jan. 16, 1986

Related U.S. Application Data

[63] Continuation of Ser. No. 671,328, Nov. 14, 1984, abandoned.

[51] Int. Cl.$^4$ .............................................. C08L 89/00
[52] U.S. Cl. ........................................ 524/20; 524/26; 524/47; 524/53; 524/211; 524/215; 524/216; 524/432
[58] Field of Search ...................... 524/18, 20, 26, 432, 524/47, 53, 211, 215, 216

[56] References Cited

U.S. PATENT DOCUMENTS

| | | | |
|---|---|---|---|
| 2,862,896 | 12/1958 | Dede et al. | 524/20 X |
| 2,963,454 | 12/1960 | Drugge et al. | 524/26 X |
| 3,206,320 | 9/1965 | Davidson et al. | 106/154 |
| 3,356,516 | 12/1967 | Schwalbe | 106/146 |
| 3,375,121 | 3/1968 | Bildusas | 106/146 |
| 3,392,048 | 7/1968 | Rolik | 524/26 X |
| 3,857,803 | 12/1974 | Shenfeld et al. | 260/17.4 ST |
| 4,352,692 | 10/1982 | Krinski et al. | 106/79 |
| 4,421,564 | 12/1983 | Graham et al. | 106/154 R |

Primary Examiner—Joseph L. Schofer
Assistant Examiner—J. M. Reddick
Attorney, Agent, or Firm—Robbins & Laramie

[57] ABSTRACT

An adhesive formulation useful for applying a paper label to a glass bottle, having the tack and rheology making it suitable for use in modern labeling equipment, and imparting water immersion resistance in ice water for a period of at least 72 hours. Based on soy protein isolate; does not use casein.

4 Claims, No Drawings

LABELING ADHESIVES

This application is a continuation of application Ser. No. 671,328, filed Nov. 14, 1984, now abandoned.

BACKGROUND OF THE INVENTION

This invention relates to an adhesive composition of general utility but possessed of certain advantageous characteristics. Adhesives formulated in accordance with the present invention have tack and rheology suitable for use in high-speed labeling equipment, are water-resistant, yet are easily cleaned off under certain conditions.

Bottled beverages such as fruit juices, soft drinks and beer are often chilled by placing them in ice water. To all concerned, it is important that the labels which identify the contents of the bottles not become detached from the bottles because of immersion.

Casein-based adhesives were developed for this type of application many years ago. However, casein is not a satisfactory raw material because of fluctuations in its availability, and, as well, differences in quality. Much work has been done with casein-based formulations, however, because of the excellent properties that some of these formulations exhibit, particularly with respect to ease of removal.

Because of dissatisfaction with the availability of casein supplies, starch-based adhesive formulations have been developed. Good formulations are disclosed, for example, in U.S. Pat. No. 3,857,803, granted Dec. 31, 1974 to R. S. Shenfeld and O. E. Brown. Generally, the formulations disclosed there comprise water, starch, a nitrogeneous substance such as urea, dicyandiamide, or a mixture of these, and an ammoniated hydrolysis product of a styrene/maleic anhydride copolymer. These formulations have excellent properties but tend to exhibit removability characteristics that are not desirable, such as, for example, the tendency to leave scum and residue on glass after removal of a label in connection with preparing the bottle for reuse.

SUMMARY OF THE INVENTION

The present invention provides a labeling adhesive that does not rely upon the use of casein. It nevertheless has the requisite tack and rheology to make it suitable for use in labeling equipment, and to provide water immersion resistance in ice water for a period of at least 72 hours. In addition, adhesive compositions according to the invention can be formulated to be easily and cleanly removed in existing cleaning equipment used in connection with returnable bottles.

A labeling adhesive that is formulated in accordance with the invention has as one important ingredient a soy protein isolate component. This component is selected to impart the necessary viscosity and rheology to the formulation. It must often be custom-blended with other ingredients to meet the requirements of different labeling machines.

The protein component employed preferably is a mixture of two different, chemically modified soy protein isolates. The two are used in combination to achieve desired viscosity and other properties.

Another important component of the labeling adhesive is a synthetic polymer. Suitable polymers for use include polyvinyl acetate homopolymer, ethylene vinyl acetate copolymer, and several of the acrylic and methacrylic polymers and copolymers. It is believed that this synthetic polymer serves to facilitate handling of the adhesive in the labeling machine, makes spreading of the adhesive easier, and may also function as a suspending agent. Other components preferably used in the formulation include an alkaline substance as a solubilizing agent, preferably ammonium hydroxide, and a zinc oxide dispersion, as an insolubilizing agent.

Other components that are preferred for use include wheat flour or the equivalent, as a tack modifier; a nitrogeneous material such as a mixture of urea and dicyandiamide, or ammonium nitrate, or urea, as a fluidizer; and one or more preservative agents, such as Dowicide A, Dowicide G, or a mixture of these. To complete the formulation, enough water is used so that the desired viscosity and other properties are attained.

When a labeling adhesive formulation is to be applied using a modern piece of labeling equipment that can operate well with a watery, low-viscosity adhesive formulation, it is possible to formulate the adhesive using just a single soy protein isolate. Generally, however, the use of a mixture of two is preferred, to provide a formulation that can be accommodated on a broad spectrum of equipment.

DETAILED DESCRIPTION OF THE INVENTION

There are two types of soy protein isolates available commercially. These are the modified and unmodified types. Both types of isolated protein are derived from the same raw material, soybean flakes or meal. This is the material left over after soybean oil has been extracted by the solvent extraction process. The residual flakes or meal contain protein, carbohydrates and moisture, together with a fractional percentage of unextracted oil. To produce a protein isolate, the flakes or meal are mixed with water and alkali. The proteinaceous materials go in the solution, and after separating off the solids, can be precipitated from the solution by the addition of an acid. The precipitate is in the form of a curd. The curds are centrifuged, filtered, dried and ground, to produce the commercially available unmodified soy protein isolate product.

Modified or hydrolyzed protein is produced by a process that includes a second dissolution with alkali, together with a heat treatment. The protein is reprecipitated after several hours of digestion at an elevated temperature and high pH. The precipitate is then centrifuged, filtered, dried and ground.

The particular type of soy protein isolate which may be employed in the present invention is not critical to its practice, although typically a hydrolyzed or modified soy protein isolate should be employed. Generally, a hydrolyzed or modified protein isolate is produced, as summarized briefly above, by treatment of the extracted curd with alkaline reagents such as sodium or ammonium hydroxide, or other modifying agents under controlled conditions of pH, temperature, and time to dissociate and unfold the complex protein structure into smaller but heterogeneous units. This treatment results in the formation of a protein curd which has been essentially modified from its native state.

There are several differences between the two types of proteins, i.e., unmodified and chemically modified. These are differences in viscosity, solution color, and formulating techniques required. Some of the techniques for producing and using soy protein isolates are described in U.S. Pat. Nos. 4,278,597, 4,309,344, and 4,421,564, all assigned to Ralston Purina Company, which is one commercial supplier of soy protein isolates.

The use of a combination of two different modified soy protein isolates produces a mixture having some of the desirable characteristics of each. For this reason, and to insure a balance of properties, it is generally preferred but not essential that such substantially equal parts by weight of the two different modified soy protein isolates be used. Generally, the mixture may be used in an amount of from about 12% to about 30% by weight of the completely formulated adhesive composition. While it is preferred that equal parts of the two isolates be used, the ratio most often should fall in the range from about 2:1 to about 1:2, depending upon the particular properties sought. Generally, the respective amounts are selected by trial and error so that the final viscosity of the formulation is in the range from 7,000 cps to 300,000 cps, and preferably from 15,000 cps to 75,000 cps, as measured on a Brookfield viscometer, with an appropriate spindle and speed, at 25° C.

The two soy protein isolate products that are used together in a preferred embodiment of the invention have been found, in empirical fashion, to provide a combination of characteristics that, when formulated into an adhesive composition in accordance with the invention, provide good results in a variety of existing labeling machines. Ordinarily a particular labeling machine will be found to have certain parameters as to viscosity and rheology of the adhesive formulations that it can use, for good performance. Older machines tend to require viscous formulations. Some of the newer pieces of equipment can operate successfully with labeling adhesive formulations that are quite watery, in other words, that have very low viscosities. With such modern machinery, it is possible to utilize an adhesive formulation containing only a single soy protein isolate, but in much of the older equipment, a combination of two soy protein isolates has been found to be desirable in order to achieve good operating characteristics.

One preferred soy protein isolate is available from Ralston Purina Company, St. Louis, Mo., under the designation PP-2500. This is a natural polymer that has been extracted from soybeans and chemically modified.

This soy protein isolate PP-2500 is a light tan granular powder. The granules are sufficiently fine that less than 2% of the granules are retained on a U.S. Standard 30-mesh sieve. Moisture content is about 10%, generally being in the range from 9% to 11% by weight of the granular powder. Fat content is extremely low, generally less than 0.1% by weight. The ash content ordinarily is less than 3% by weight. When the isolate is made up into a solution as described below, the solution is ordinarily translucent to opaque, depending to some extent on the cooking temperature. The solution rheology is ordinarily thixotropic/pseudoplastic. In color, the solution is generally tan or light yellow. When made up into an aqueous slurry, the pH is from about 3.8 to about 4.6, that is, on the acid side.

Ordinarily, when this soy protein isolate is made up in an aqueous solution for use, the following steps are recommended for preparing a solution at 20% to 26% solids concentration:

(1) Heat sufficient water to 140°–145° F. (60°–62° C.) to disperse the solids.

(2) Under vigorous agitation, add the dry polymer to the heated water as rapidly as possible. The wettability of this isolate is excellent and only a few minutes (2 to 5) of wetout time with vigorous stirring is required.

(3) Addition of the isolate to the water may cause some cooling and the slurry should be returned to the cook temperature as rapidly as possible and held there throughout the remainder of the procedure and any subsequent holding periods. (The longer it takes the slurry to reach the cook temperature, the darker will be the final solution color).

(4) Add ammonia (20%, 26° Be based on dry weight of polymer) immediately after the slurry reaches the cook temperature. (The longer the delay in adding the ammonia, the darker will be the final solution color).

(5) The solution should be cooked at the specified temperature for 20 to 30 minutes. (The longer the cook time and the higher the cook temperature above that specified, the darker will be the final solution color). Temperatures which approach 70° C. will effectively counter those measures which have been used in production to obtain a lighter color. However, functionalty as an adhesive will not be altered.

A second soy protein isolate that is preferred for use is identified by Ralson Purina, its manufacturer, as RXP-5001. This is principally a soy protein isolate that has been chemically modified. When used alone, generally it is made up into a solution before use. In the practice of the present invention, however, it is ordinarily mixed with other dry ingredients and the mixture is placed into solution. However, it is possible to place in solution initially each soy protein isolate that is to be used, and then use the solutions in preparing an adhesive formulation in accordance with the invention. To prepare a solution of RXP-5001, the same steps as described above are useful.

RXP-5001 chemically modified soy protein isolate, when placed in an aqueous solution at a concentration of 13.5% solids, exhibits a viscosity of 100–400 cps, as measured on an LVF Brookfield Viscometer, #3 spindle, at 60 rpm at 25° C. This protein isolate is a light tan granular powder. The granules are sufficiently fine so that less than 2% by weight are retained on a U.S. Standard 30-mesh sieve. Moisture content is generally in the range from 9% to 11% by weight, and the ash content is less than 3% by weight. Solution clarity generally is from translucent to opaque, and the solution is tan to light yellow in color. The solution rheology is thixotropic/pseudoplastic. An aqueous slurry of this isolate in water has a pH of approximately 3.7, which is slightly more acidic than a slurry of the PP-2500 soy protein isolate.

The viscosities of these polymers are influenced by the presence of other materials in any solution, and particularly by urea. Their average dissociated molecular weights, in a 4 molar urea solution, are:

| Soy Protein Isolate | Mol. Wt. |
| --- | --- |
| PP-2500 | 130,000 |
| RXP-5001 | 100,000 |

In solution, these soy protein isolates, which are polymeric in nature, form different sedimentation fractions or globulins, depending upon the pH and other solution conditions. A native soy protein polymer is not a single structure but consists of four major components. These components or subunits are different combinations of about 20 amino acids that differ in size, charge, and order. The associated sedimentation fractions are a function of the solution, and thus their apparent molecular weights can change with solution characteristics.

In labeling adhesive formulations prepared in accordance with the invention, for particular pieces of equipment it might be possible to use a single one of these soy protein isolates in the formulation, depending upon the ability of the particular piece of equipment to be used to handle a formulation at a particular viscosity. For general use with a spectrum of different equipment made at different times and having different operating parameters and requirements, it is preferred that the formulation be based upon a mixture of two chemically modified soy protein isolates having different average dissociated molecular weights in urea solution and different viscosity characteristics. The proportions of the two different soy protein isolates can then be adjusted as necessary in order to adjust the viscosity and other formulation characteristics to those considered optimum for a particular piece of equipment. Generally, for simplicity, approximately equal parts by weight are preferred, and are useful with much of the equipment that is installed and in use today.

Along with the protein isolate mixture, a water-dispersible synthetic polymeric material is included in the adhesive formulation, to aid adhesion and to improve handling on the labeling machine. In general, it is believed that the polymers that may be used should have high molecular weights, in excess of about 50,000; but the molecular weight may fall within a wide range above that figure. It is also believed that the polymer should have a glass transition temperature of at least 25° C. or higher, to contribute to the adhesive properties at an elevated temperature, and to impart hardness and stiffness to the dried adhesive at low temperatures.

The preferred polymers for use in formulating adhesives according to the invention are polyvinyl acetate homopolymer, ethylene vinyl acetate copolymers, and the acrylic and methacrylic polymers and copolymers. Those preferred have a molecular weight of at least 20,000, preferably above at least 50,000, and preferably a glass transition temperature of about 20° C. or higher.

The high molecular weight synthetic polymer may be added either in the form of a powder or as an emulsion, but preferably is added as an emulsion. When added in the form of a powder, it ordinarily disperses in the aqueous adhesive formulation, but at the usual basic pH that is employed, may go partly or entirely into solution. The amount of synthetic polymer emulsion to be added is generally in the range from about 1% to about 10% by weight of the emulsion, as is basis, based on the complete adhesive formulation. The preferred emulsions generally contain 40% to 65% solids, approximately.

The preferred polyvinyl acetate homopolymer emulsions are two commercially available products: an emulsion sold by Union Chemicals Division of Union Oil under the trademark 76 RES 19RB64, and an emulsion sold by Union Carbide under the trademark UCAR ® Latex 130. Both are similar in properties. The properties of the UCAR ® Latex 130 are:

| | |
|---|---|
| Total solids | 57.0 to 59.0% by wt. |
| Latex Viscosity at 20° C. (Brookfield No. 4 at 60 rpm) | 1,500 to 2,500 cps. |
| Solution Viscosity at 20° C. Resin, Water, and DMF in ratio of 2, 5 and 93 parts by wt. | 5.5 to 8.5 cps. |
| pH | 4.0 to 6.0 |
| Specific Gravity at 20/20° C. Latex | 1.104 |
| Weight per Gallon at 20° C. | 9.26 lb. |
| Latex Monomeric Vinyl Acetate | 0.6% by wt., max. |

The synthetic polymer selected may also be a copolymer or a mixture of polymers, depending upon the balance of properties sought in the final adhesive formulation. When added in the form of an emulsion, the added polymer may be, for example, natural butyl rubber and styrene-butadiene latex. Other synthetic polymers such as the alkadienes-acrylonitrile copolymers (butadiene-acrylonitrile), the polyacrylates wich include polymers and copolymers of acrylic and methacrylic acids and their lower alkyl esters such as polymethyl methacrylate and polyethyl acrylate, the vinyl lower carboxylates (preferably polyvinyl acetate), polyvinyl propionate and also copolymers of the vinyl lower carboxylates with the lower alkyl alcohol esters of unsaturated mono- and dicarboxylic acids (copolymer of 80% polyvinyl acetate and about 20% dibutyl maleate for example) can be added. Also included are the polyvinyl halides such as the plasticized and unplasticized polyvinyl chlorides (Exon and Geon series), the copolymers of vinyl halides with vinylidene halide or vinyl carboxylates (copolymers of vinyl chloride with vinylidene chloride or vinyl acetate) the polyvinyl lower alkyl ethers such as polymethyl vinyl ether, polyethyl vinyl ether, polyvinyl n-butyl ether and polyvinyl isobutyl ether, and copolymers of alkyl acrylates and vinyl pyrrolidone such as vinyl pyrrolidone-ethyl acrylate copolymer emulsions. These resins are usually emulsified or dispersed in water and are readily incorporated in the adhesive base.

A zinc oxide or similar insolublizing agent is also incorporated in the adhesive formulation. The zinc oxide is ordinarily added in the form of a 50% dispersion. The amount employed of this 50% dispersion is in the range from about 0.5% to 5% by weight, as is basis, of the complete formulation. Other insolubilizing agents can be used in place of zinc oxide. These impart water tolerance so that the labeled bottle can be immersed in ice water for a long period of time, without failure of the adhesive.

A 26° Be solution of ammonium hydroxide is also preferably included in the formation. The amount employed is from about 0.5% to about 5% by weight of the ammonia solution, as is basis. It effects initial solubilization of the protein.

The final essential component of the adhesive formulation is water, which generally constitutes from 40% to 60% by weight of the complete formulation.

There are other desirable components for making an adhesive formulation that performs well. Among these are wheat flour or the equivalent, which is used as a tack modifier and anti-stringing agent. When wheat flour is used, the amount ordinarily is from about 2% to 15% by weight of the wheat flour, based on the complete formulation. While wheat flour or wheat starch are preferred materials, the flours and starches of corn and potatoes are acceptable, as are modified corn flour and starch. These less preferred materials, if used, change the formulation's characteristics as to viscosity, wet tack, and machine application. Such changes may require formulation adjustments for optimum performance but may also be beneficial for some applications. Preservatives are also used, generally a Dowicide A or Dowicide G preservative, or a mixture of these. The amount ordinarily is from 0.5% to 5% by weight of the complete formulation.

Also, it is preferred that a nitrogeneous fluidizing agent be incorporated in the formulation. Urea is preferred. Ammonium nitrate may be used. Dicyandiamide, in mixtures with urea, and other similar fluidizing agents, are known and can also be used. When the fluidizing agent employed is urea, the amount ordinarily is in the range from about 14% to 28% by weight of the complete formulation. Dicyandiamide can be substituted for up to one-half of the urea, by weight.

It is also beneficial to use a defoamer, from both the manufacturing and the application standpoints. Many commercial defoamers are available and useful; Colloid 581B defoamer is preferred. It can be effective in amounts as low as 0.1%. It is an off-white, opaque liquid having a pH of about 5.5 in a 2% dispersion.

To summarize, a complete adhesive formulation in accordance with preferred embodiments of the present invention will conform generally to the following:

TABLE 1

| Adhesive Formulation | |
|---|---|
| Component | % by weight |
| Modified Soy Protein Isolate PP-2500 | 6-15 |
| Modified Soy Protein Isolate RXP-5001 | 6-15 |
| High molecular weight synthetic polymer | 1-10 |
| Insolubilizing agent | 0.5-5 |
| Basic pH control agent | 0.5-5 |
| Tack modifier | 2-15 |
| Preservative | 0.5-5 |
| Fluidizer | 14-28 |
| Defoamer | 0.1 or higher |
| Water | 40-60 |

When the adhesive formulation is made up in accordance with preferred embodiments of the present invention, it will conform generally to the following:

TABLE 2

| Preferred Adhesive Formulations | |
|---|---|
| Component | Preferred Range, % by weight |
| Modified Soy Protein Isolate PP-2500* | 6-15 |
| Modified Soy Protein Isolate RXP-5001* | 6-15 |
| Polyvinyl Acetate homopolymer emusion | 1-10 (as is) |
| Zinc Oxide, 50% dispersion in water | 0.5-5 (as is) |
| Ammonium Hydroxide, 26° Baume | 0.5-5 (as is) |
| Wheat Flour | 2-15 |
| Dowicide A preservative | 0.5-5 |
| Urea | 14-28 |
| Colloid 581B defoamer (Colloids, Inc.) | 0.1-0.2 |
| Water | 40-60 |

*Supplier, Ralston-Purina Company

When a formulation is made up from the components and in the proportions suggested in Table 2 for good results, the preferred procedure for manufacturing the adhesive formulation is as follows. The water is added to a clean tank together with the zinc oxide dispersion and the wheat flour or other source of starch. Urea and the defoamer material are slowly added, while the liquid material is stirred. The two soy protein isolates are then added slowly. When the addition has been completed, mixing is continued for about 10 minutes or longer if necessary to insure that the soy protein isolates have been completely wetted.

The liquid ammonia is then added in sufficient quantity, generally, to attain a pH in the range from 9.0 to 9.5. The liquid mix is then heated to about 60° C. (140° F.) and held at that temperature for about 15 minutes to permit equilibration. At the end of that approximate period of time, a small amount of the mixture is withdrawn and drawn into a film on glass, to determine the presence or absence of undissolved particles. If there is a substantial absence of undissolved particles, meaning that the ingredients have gone into solution, the polyvinyl acetate emulsion is added. The preservative is then added, and any additional defoamer, if desired. The pH is adjusted if necessary to the preferred range 9.0 to 9.5, using liquid ammonia. The viscosity and pH are checked, and the viscosity can be adjusted by reducing it, if desired, with water.

Generally, the pH of the completed formulation should be on the alkaline side. However, the system is very pH-tolerant, and a pH range of from 7.0 to 11.0 is useful.

The viscosity of which the formulation will be made up can be selected to accommodate the particular adhesive application machinery that is being employed. Generally, the viscosity will be in the range from 7,000 to 300,000 cps, as measured on a Brookfield viscometer at 25° C., using an appropriate spindle and speed, at 25° C. Preferably, the viscosity measured in this manner is in the range from 15,000 to 75,000 cps.

Adhesive formulations can be formulated in accordance with the invention that make good adhesives for securing labels on beverage bottles. They can have good glass-to-paper tack and adhesion. They can also have the durability to withstand submersion in ice water for prolonged periods without failure, i.e., for 8 hours easily and for more than 72 hours with preferred formulations.

The invention will now be described in somewhat greater detail in the following specific example. In the example, all parts and percentages are by weight, and all temperatures are specified in degrees Celsius, unless expressly stated to be otherwise. The parts by weight are dry basis, but in the case of solutions or emulsions, are on an as-is basis unless otherwise so stated.

EXAMPLE 1

Adhesive Formulation for Water Immersion Resistance

A labeling adhesive formulation was made up in accordance with a preferred embodiment of the invention to have tack and rheology suitable for use in conventional beverage bottle labeling equipment. The ingredients used were as follows:

TABLE 3

| Preferred Adhesive Formulations | |
|---|---|
| Component | Preferred Range, % by Weight |
| Modified Soy Protein Isolate PP-2500* | 9.24 |
| Modified Soy Protein Isolate RXP-5001* | 9.23 |
| Polyvinyl Acetate homopolymer emuslion** | 3.15 (as is) |
| Zinc Oxide, 50% dispersion in water | 2.62 (as is) |
| Ammonium Hydroxide, 26° Baume | 1.66 (as is) |
| Wheat Flour | 6.00 |

TABLE 3-continued
Preferred Adhesive Formulations

| Component | Preferred Range, % by Weight |
| --- | --- |
| Dowicide A preservative | 0.10 |
| Urea | 21.00 |
| Colloid 581B defoamer | 0.1 |
| Water | 47.00 |

*Supplier, Ralston Purina Company
**The polyvinyl acetate homopolymer emulsion used was an hydroxyethyl cellulose-protected emulsion characterized by fast speed of set and water resistance. It was purchased from Union Chemicals Division of Union Oil. Its solids content was 58%, and viscosity 2,000 cps as measured on a Brookfield Model RVF viscometer at 25° C. Its pH was 4.5.

This formulation was made up by first mixing together in a clean tank the water, zinc oxide dispersion and the wheat flour. Urea and defoamer material were then slowly added. After these had been dispersed in the mixture, the two soy protein isolates were slowly added, and the mixing was continued for about 10 minutes following completion of their addition. Mixing was continued until the soy protein isolate granules appeared to have been completely wetted.

At that point the liquid ammonia was added in sufficient quantity to adjust the pH to the range 9.0 to 9.5. The tank contents were then heated to 60° C. (140° F.) and held at that temperature for about 15 minutes. At that point an initial inspection was made by taking a sample of the liquid and drawing it as a film on a glass, to determine whether there had been complete dissolution of the materials. If not, the heating and mixing were continued until a complete solution was achieved. Then the polyvinyl acetate emulsion was added. Finally, the preservative was added.

The viscosity was determined on a HAF Brookfield Viscometer using a #3 spindle at 1 rpm, at 25° C., and found to be 48,000 cps. Any necessary reduction in the viscosity, to accommodate the needs of a particular labeling machine, can be made by adding water. As a final step, the pH should be adjusted to 9.0 to 10.5 with liquid ammonia as necessary. Generally viscosities in the range from 40,000 cps to 60,000 cps are satisfactory and are observed, measured as above, but at 60 rpm, when the pH is 9.0-10.5 and the solids content is 46%-50%.

This adhesive formulation had adhesive tack and rheology suitable for use on conventional labeling equipment in a beer bottling plant, and was evaluated in that plant. It was applied without any problems. After being permitted to cure for a reasonable period of time, several of the labeled bottles were immersed in ice water for 72 hours. The adhesive did not fail at the end of that time; all labels remained in position was originally applied. For test purposes, the labeled bottles had not been filled with beer, and they were now placed in the plant cleaning equipment used for cleaning returnable bottles. The bottles were immersed in a caustic soda solution at a concentration of 4% and at a temperature of 160° F. (71° C.). After a short period of being wet at this temperature with the caustic soda solution, the labels dropped off. There was no scum or film remaining on the glass; rather, the glass was clean and ready for use.

EXAMPLE 2

Following generally similar procedures, but adjusting components and their percentages, three additional formulations were prepared and evaluated, as reported below in Table 4.

| Ingredient | 2A | 2B | 2C |
| --- | --- | --- | --- |
| Modified Soy Protein Isolate PP-2500 | 9.23 | 5.03 | 5.02 |
| Modified Soy Protein Isolate RXP-5001 | 9.24 | 12.76 | 12.76 |
| PVA Homopolymer (as in Ex. 1, as is) | 3.15 | 3.09 | 3.09 |
| Zinc Oxide 50% Dispersion (as is) | 4.00 | 2.51 | 2.51 |
| Ammonium Hydroxide (as is, 26° Baume) | 2.00 | 3.87 | 3.87 |
| Amioca Starch | 6.00 | — | — |
| Dowicide Preservative | .10 | .09 | .08 |
| Urea | 21.00 | 20.12 | 20.12 |
| Colloid 581B Defoamer | .40 | — | — |
| Water | 44.88 | 45.65 | 45.23 |
| Wheat Starch | — | 5.80 | 5.80 |
| Zinc Acetate | — | 1.08 | 1.08 |
| Ammonium Thiocyanate | — | — | .46 |
| | 100.00 | 100.00 | 100.00 |

2A Viscosity 48,000 cps, HAF #3 1 rpm @ 25° C. Water resistance: Passed 72 hours immersion test.
2B Viscosity 80,000 cps, HAF #3 1 rpm @ 25° C. Water resistance: Passed 72 hours immersion test.
2C Viscosity 54,000 cps, HAF #3 1 rpm @ 25° C. Water resistance: Passed 72 hours immersion test. This formulation shows the liquefying properties of ammonium thiocyanate; little or no adverse effect on water resistance.

Example 2A demonstrates the use of amioca starch.

Example 2B discloses a formulation using zinc acetate as well as zinc oxide, as insolubilizing agents.

In Example 2C, zinc acetate and zinc oxide are again used together and in addition, ammonium thiocyanate is included as a supplemental liquefying agent for better viscosity control.

GENERAL

Adhesive formulations made in accordance with this invention offer many advantages to the user. Since these formulations make use of soy protein isolates, which are abundantly available in the United States at the present time, there is no fluctuation in the availability of the basic raw material, as is the case with casein. Furthermore, adhesive formulations may be made in accordance with the invention to have the tack and rheology necessary for modern, conventional labeling equipment, and these formulations have excellent water immersion resistance. Moreover, the removability problems that are generally associated with starch-based labeling adhesives are not observed.

To use adhesive formulations prepared in accordance with the invention, the preferred kind of label equipment is one where the formulation is applied at room temperature to pickers. The pickers in turn apply the adhesive to the label. The label is then pressed on the bottle in the proper position, and the adhesive is permitted to harden. Once it hardens or cures, the presence of the insolubilizing agent in the adhesive formulation imparts good durability to the adhesive formulation, to the point where a labeled bottle can be complete immersed in ice water for 8 hours, or with care and formulation, for as long as 72 hours, without failure of the adhesive. Moreover, when the bottles are recycled and cleaned for reuse, by the hot caustic procedure already described, the label comes off without leaving any residue on the surface of the bottle.

Still another important advantage to the consumer is that as compared to starch-based and casein-based adhesives, the formulations of the invention permit economics since generally smaller amounts are required.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. An adhesive formulation that is useful for labeling glass bottles and capable of forming a glass-to-paper bond, and that is durable following submersion for 8 hours or more in ice water, comprising, in percentages by weight based on the entire formulation:

from 12% to 30% of a modified soy protein isolate;
an effective amount of an insolubilizing agent for said soy protein isolate that, upon setting of the adhesive, insolubilizes said isolate to impart durability of said formulation to submersion in water;
from 1% to 10% of a water-dispersible synthetic polymer;
for 1% to 15% of a source of starch as a tack modifier;
from 14% to 18% of at least one fluidizing agent;
an aqueous vehicle for said formulation, in which the other components are dissolved or dispersed, and
pH control means adjusting said formulation to pH 7 to 11;
wherein said modified soy protein isolate is a mixture of two different modified soy protein isolates of different average dissociated molecular weights, respectively;
wherein the proportions of the two different soy protein isolates are adjusted relative to each other so that the viscosity of the formulation is in the range of 7,000 cps to 300,000 cps;
wherein the relative proportions of said two soy protein isolates are adjusted so that the viscosity of said adhesive formulation is in the range from 15,000 cps to 75,000 cps; and
wherein said insolubilizing agent comprises from 0.2% to 2.5% by weight of zinc oxide, dry basis; said tack modifier comprises wheat starch or wheat flour; said fluidizing agent is urea; said synthetic polymer is an emulsion of polyvinyl acetate; said pH control means is ammonia, and said formulation further comprises small but effective amounts of preservative and defoamer.

2. An adhesive formulation that is useful for labeling glass bottles and capable of forming a glass-to-paper bond that is durable following submersion for 8 hours or more in ice water, said adhesive formulation comprising, in percentages by weight based on the entire formulation;

from 12% to 30% of a mixture of two modified soy protein isolates of different respective average dissociated molecular weights, in such proportions relative to each other and to the said adhesive formulation that the final viscosity of the formulation is in the range from 7,000 cps to 300,000 cps;
an effective amount of an insolubilizing agent for said soy protein isolates that, upon setting of the adhesive, insolubilizes said isolates to impart durability of the formulation to submersion in ice water;
from 1% to 10% of a water-dispersible synthetic polymer;
from 1% to 15% of a source of starch, as a tack modifier;
from 14% to 28% of at least one fluidizing agent;
an aqueous vehicle for said formulation, in which the other components are dissolved or dispersed, and
means adjusting the pH of said formulation to the range from pH 7 to 11;
wherein the amount of each of said different modified soy protein isolates is in the range from 6% to 15% by weight;
wherein said water-dispersible synthetic polymer consists of an emulsion of polyvinyl acetate and said soy protein isolates are present in such proportions that the final viscosity of the formulation is from 15,000 to 75,000 cps;
said insolubilizing agent consists of from 0.2% to 2.5% by weight of zinc oxide, dry basis; said tack modifier is wheat starch or wheat flour; said fluidizing agent is urea; said pH control means comprises ammonia, and said formulation also consists of small but effective amounts of preservative and defoamer.

3. An adhesive formulation that is useful for labeling glass bottles and capable of forming a glass-to-paper bond that is durable following submersion for 8 hours or more in ice water, consisting essentially of, in percentages by weight based on the adhesive formulation;

from 6% to 15% of each of two different modified soy protein isolates of different average dissociated molecular weights respectively, the proportions of the two soy protein isolates relative to each other and relative to the adhesive formulation being selected so that the viscosity of said adhesive formulation is in the range from 15,000 cps to 75,000 cps;
from 0.2% to 2.5% of zinc oxide, dry basis, as an insolubilizing agent for said soy protein isolates that, upon setting of the adhesive, insolubilizes said isolates and imparts durability to said set adhesive upon submersion in ice water;
from 1% to 10% of a water-dispersible synthetic polyvinyl acetate;
from 1% to 15% of a source of wheat starch as a tack modifier;
from 14% to 28% of urea as a fluidizing agent;
an aqueous vehicle for said formulation in which the other components are dissolved or dispersed, and
sufficient ammonia to adjust the pH to the range from 7 to 11.

4. The adhesive formulation of claim 3, wherein there are approximately equal parts by weight of said two different soy protein isolates.

* * * * *